(12) United States Patent
Kim et al.

(10) Patent No.: US 11,438,188 B2
(45) Date of Patent: Sep. 6, 2022

(54) MULTICAST PACKETS FOR A WIRELESS LOCAL AREA NETWORK

(71) Applicant: Apple Inc., Cupertino, CA (US)

(72) Inventors: Joonsuk Kim, Saratoga, CA (US); Young Jae Kim, San Jose, CA (US)

(73) Assignee: Apple Inc.

( * ) Notice: Subject to any disclaimer, the term of this patent is extended or adjusted under 35 U.S.C. 154(b) by 406 days.

(21) Appl. No.: 15/710,708

(22) Filed: Sep. 20, 2017

(65) Prior Publication Data

US 2018/0083793 A1 Mar. 22, 2018

Related U.S. Application Data

(60) Provisional application No. 62/397,853, filed on Sep. 21, 2016.

(51) Int. Cl.
*H04L 12/18* (2006.01)
*H04L 45/16* (2022.01)
*H04W 72/00* (2009.01)

(52) U.S. Cl.
CPC ........ *H04L 12/1877* (2013.01); *H04L 12/185* (2013.01); *H04L 12/1863* (2013.01); *H04L 45/16* (2013.01); *H04L 12/189* (2013.01); *H04W 72/005* (2013.01)

(58) Field of Classification Search
CPC .... H04L 12/1877; H04L 1/1863; H04L 45/16
See application file for complete search history.

(56) References Cited

U.S. PATENT DOCUMENTS

| | | | | |
|---|---|---|---|---|
| 2006/0264218 A1* | 11/2006 | Zhang | ........... | H04W 72/04 455/450 |
| 2008/0186913 A1* | 8/2008 | Ahn | ........... | H04L 12/185 370/329 |
| 2009/0268645 A1* | 10/2009 | Chindapol | ........... | H04L 5/0007 370/281 |
| 2010/0008326 A1* | 1/2010 | Albanese | ........... | H04W 72/005 370/331 |
| 2011/0188598 A1* | 8/2011 | Lee | ........... | H04W 84/12 375/267 |
| 2011/0194475 A1* | 8/2011 | Kim | ........... | H04L 1/0053 370/311 |
| 2012/0113942 A1* | 5/2012 | Kim | ........... | H04L 1/1861 370/329 |

(Continued)

OTHER PUBLICATIONS 302.11AC In-Depth, White Paper, Aruba Networks, 2014, 37 pages.

*Primary Examiner* — Jael M Ulysse
(74) *Attorney, Agent, or Firm* — Dickinson Wright RLLP

(57) ABSTRACT

Methods and apparatus for transmission of data streams using a multicast packet format based on group identifiers (Group IDs) to deliver data to multiple recipient stations (STAs). Using Group IDs, an access point (AP) assigns multiple STAs to one or more groups, and uniquely assigns each STA to a particular position within the group, such that it can receive a requested data stream. A Group ID management action frame provided by the AP to an individual STA indicates to which group (or groups) the STA is assigned and the STA's position within the group, with which information the STA can determine whether a packet is intended for the STA and which portion of the packet to decode in order to receive requested data streams.

20 Claims, 10 Drawing Sheets

(56) References Cited

U.S. PATENT DOCUMENTS

| | | | |
|---|---|---|---|
| 2012/0120931 A1* | 5/2012 | Abraham | H04W 72/005 370/338 |
| 2012/0163292 A1* | 6/2012 | Kneckt | H04W 52/0229 370/328 |
| 2012/0327838 A1* | 12/2012 | Seok | H04W 4/06 370/312 |
| 2013/0010708 A1* | 1/2013 | Abraham | H04W 72/046 370/329 |
| 2013/0301569 A1* | 11/2013 | Wang | H04L 1/1607 370/329 |
| 2013/0329620 A1* | 12/2013 | Kim | H04W 52/0229 370/311 |
| 2014/0086131 A1* | 3/2014 | Seok | H04W 52/0225 370/311 |
| 2014/0112266 A1* | 4/2014 | Seok | H04W 74/04 370/329 |
| 2014/0226556 A1* | 8/2014 | Lee | H04W 4/06 370/312 |
| 2014/0314054 A1* | 10/2014 | Seok | H04W 8/26 370/336 |
| 2015/0180559 A1* | 6/2015 | Kim | H04B 7/0452 370/338 |
| 2015/0230244 A1* | 8/2015 | Choi | H04L 1/1614 370/329 |
| 2015/0341959 A1* | 11/2015 | Seok | H04W 74/006 370/338 |
| 2016/0174200 A1* | 6/2016 | Seok | H04W 72/04 370/329 |
| 2016/0227569 A1* | 8/2016 | Wang | H04W 72/1278 |
| 2016/0249185 A1* | 8/2016 | Kondabattini | H04W 4/08 |

* cited by examiner

MULTICAST PACKETS FOR A WIRELESS LOCAL AREA NETWORK

CROSS-REFERENCE TO RELATED APPLICATIONS

The present application claims the benefit of U.S. Provisional Patent Application No. 62/397,853, entitled "MULTICAST PACKETS FOR A WIRELESS LOCAL AREA NETWORK" filed Sep. 21, 2016, the content of which is incorporated by reference herein in its entirety for all purposes.

FIELD

The described embodiments relate generally to wireless communications, including methods and apparatus for communicating multicast packets in a wireless local area network (WLAN).

BACKGROUND

Multiple stations (STAs) of a WLAN share a common band (or bands) of radio frequency (RF) resources. WLAN access points (APs) coupled to high capacity backhaul connections provide users with access to a broad array of services including alternatives to conventional broadcast media, such as user selectable Internet Protocol (IP) based streaming video/audio services to replace or supplement over-the-air and broadcast cable/satellite television and radio services. Multiple STAs can receive substantially the same data streams via a single AP, when streaming the same channel of a streaming service, and duplication of the data streams to send to the multiple STAs unnecessarily wastes shared RF resources of the WLAN. While higher layer protocols, such as the IP layer, can provide for multicast distribution of service streams, lower layer protocols, such as the media access control (MAC) and physical (PHY) layers of existing WLAN communication protocols provide only limited emulation of multicast capabilities. New packet formats are needed to address lower layer multicast packets for a WLAN.

SUMMARY

Methods and apparatus that provide for transmission of a multicast packet format are based on reusing group identification (GroupID) of stations included in an 802.11 wireless communication protocol for multi-user multiple-input multiple-output (MU-MIMO) communication to deliver different data for multiple recipient stations aggregated together in the same packet without duplicating data for different recipient stations. Using Group IDs, an access point (AP) assigns multiple stations (STAs) to one or more groups and uniquely assigns each STA to a particular position within the group in order to receive a requested data stream. A Group ID management action frame provided by the AP to an individual STA indicates to which group (or groups) the STA belongs and the STA's position within the group, with which information the STA can determine whether a packet is intended for the STA and which portion of the packet to decode in order to receive requested data stream(s). Rather than repeat the same content to all member stations of the group in parallel, which would waste wireless resources, as would normally be done with MU-MIMO, the AP sends the same data only once for all member stations of the group, which provides for more efficient communication in the WLAN.

In another aspect, frequency channels of a frequency band are assigned to different groups using GroupIDs. Multiple frequency channels are multiplexed in the frequency domain, with each frequency channel providing different content, such as different data streams. A WLAN STA joins a group using the GroupID construct of a WLAN communication protocol to receive content of a frequency channel associated with the particular group. The number of different groups can be expanded beyond the number of spatial streams by assigning more bits for indicating a position within a group. Any number of parallel frequency channels of a frequency band can be accommodated using an expanded number of bits to indicate a group position within the group. In some embodiments, different frequency channels are grouped based on carrier aggregation to provide a sub-bandwidth of a radio frequency band for a data stream. In some embodiments, an indication of a number of parallel space-time streams is used for carrier aggregation to indicate an aggregated frequency channel that carries a particular data stream, which one or more STAs can request to receive using multicast transmission from the AP.

The above summary is provided only for purposes of summarizing some example embodiments so as to provide a basic understanding of some aspects of the disclosure. Accordingly, it will be appreciated that the above described example embodiments are only examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION

Figure 1:
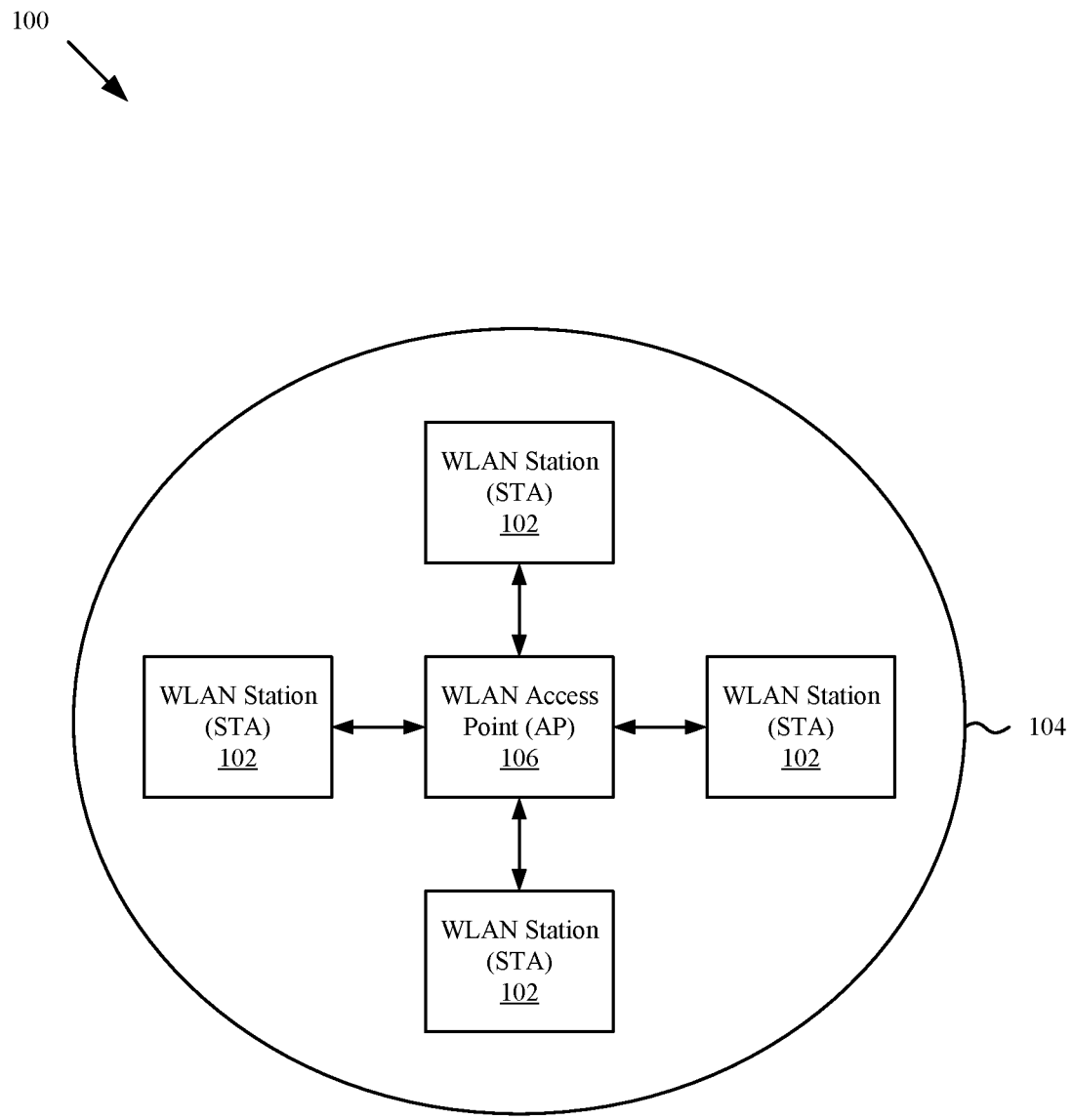
FIG. 1 illustrates an exemplary system, in accordance with some embodiments.

With the advent of high speed Internet services, both wired and wireless, traditional broadcast media, such as radio and television, has expanded from a provider determined, fixed time schedule of content to a user determined, flexible viewing of locally stored or remotely stored content on a broad array of devices. Live content can be accessed via both over-the-air (OTA) high definition (HD) television and radio services, and through Internet Protocol (IP) based subscription services. A household may include multiple recipient media playback devices that can receive content via a wireless local area network (WLAN) from an Internet connected access point (AP). When multiple devices receive the same content within substantially the same time period, limited bandwidth resources of the WLAN can be wasted to communicate the same content packets to the multiple devices independently. While IP layers of some communication protocols provide support for multicast communication to multiple endpoints, the media access control (MAC) layer of the 802.11 wireless communication protocols, commonly referred to as Wi-Fi, do not support explicit multicast packets and only allow for limited emulation of multicast capabilities. As described further herein, a multicast packet format is proposed based on reusing group identification (GroupID) of stations included in the 802.11ac wireless communication protocol for multi-user multiple-input multiple-output (MU-MIMO) communication to deliver different data for multiple recipient stations aggregated together in the same packet. Rather than duplicate data, when each of the recipient stations seeks to receive the same service within a common time window, the GroupID based packets and management frames can be modified to use for multicast communication of packets to multiple stations.

In a representative aspect, using GroupIDs, an AP can assign multiple stations to one or more groups and uniquely assign each station of a group to a particular position in that group. A single station can belong to multiple groups, and a position of the station in each group can vary for different groups. A GroupID management action frame provided by the AP to a station can indicate to which group or groups the station belongs and its position within each group. Knowing the position within a group can allow a station to determine whether the packet is intended for the station and allow the station to decode a portion of a received packet intended for the station. With MU-MIMO multiple spatial streams can be communicated in parallel to stations. Each group can be associated with specific spatial streams that can be then assigned to one or more stations of the group. The spatial streams can include common data for all of the member stations of the group. The AP can initially assign each station to a particular group, and the station can request to join one or more other groups in order to receive the content of that group in parallel with other members of the group. Rather than repeat the same content to all member stations of the group in parallel, which would waste wireless resources, as would normally be done with MU-MIMO, the AP sends the same data only once for all member stations of the group, which provides for more efficient communication in the WLAN.

In another aspect, frequency channels of a frequency band can be assigned to different groups using the GroupID. Multiple frequency channels can be multiplexed in the frequency domain, with each frequency channel providing different content. A WLAN station can join a group using the GroupID construct of a WLAN communication protocol to receive content of a frequency channel associated with the particular group. In some embodiments, the number of different groups can be expanded beyond the number of spatial streams by assigning more bits for indicating a position within a group. The current 802.11ac wireless communication protocol limits the number of spatial streams for MU-MIMO to only four; however, with additional bits to indicate a position within a group any number of parallel frequency channels of a frequency band can be accommodated.

Representative applications of systems, methods, apparatuses, and computer-readable storage media according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE) network, an LTE Advanced (LTE-A) wireless network, and/or a 5G or other present or future developed advanced cellular wireless network.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or as an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

FIG. 1 illustrates an example system 100. The system 100 can include one or more WLAN stations 102, each of which can also be referred to equivalently as a station (STA) or a client device. A STA 102 can be any computing device that can communicate via a communication channel of a WLAN 104. By way of non-limiting example, a STA 102 can be a cellular phone or smart phone, a tablet computer, a laptop computer, a notebook computer, a personal computer, a netbook computer, a media player, an electronic book device, a MiFi® device, a wearable computing device, as well as any type of electronic computing device having wireless communication capability configurable to operate as part of the WLAN 104.

In the example system 100, a STA 102 can join the WLAN 104 by communicating with a WLAN access point (AP) 106 that manages the WLAN 104. The AP 106 can be any computing device that can be configured to serve as an access point for the WLAN 104. The WLAN 104 can use any networking protocol or standard that can be used for a WLAN. In some example embodiments, the WLAN 104 can be a network that operates in accordance with an Institute of Electrical and Electronics Engineers (IEEE) 802.11 wireless communication protocol, including but not limited to 802.11a, 802.11b, 802.11g, 802.11n, 802.11ac, 802.11ax, or other present or future developed IEEE 802.11 protocol.

The AP 106 can transmit WLAN packets to and received WLAN packets from a STA 102 over an operating channel of the WLAN 104. A STA 102 can also use the operating channel of the WLAN 104 to communicate with the AP 106. The AP 106 can format WLAN packets in accordance with a structure as described further herein. The WLAN packet format for management frames and for data frames can include one or more fields. At least one or more management frames can include an action field value defined for providing multicast packet communication from the AP 106 to groups of STAs 102 in the WLAN 104. Information elements of a management action frame intended for multicast communication and sent as a unicast frame to a STA 102 can include an indication of membership in one or more groups to which the STA 102 is assigned and the position of the STA 102 within the corresponding groups. A STA 102 can seek to join a group by sending a request message to the AP 106 to join a group, and in response to receiving a management action frame that includes the assignment of the STA 102 to the requested group, the STA 102 can receive data packets intended for the group. Each member of a group can receive the same multicast data packets without requiring duplication of data packets across multiple members of the group.

Figure 2:
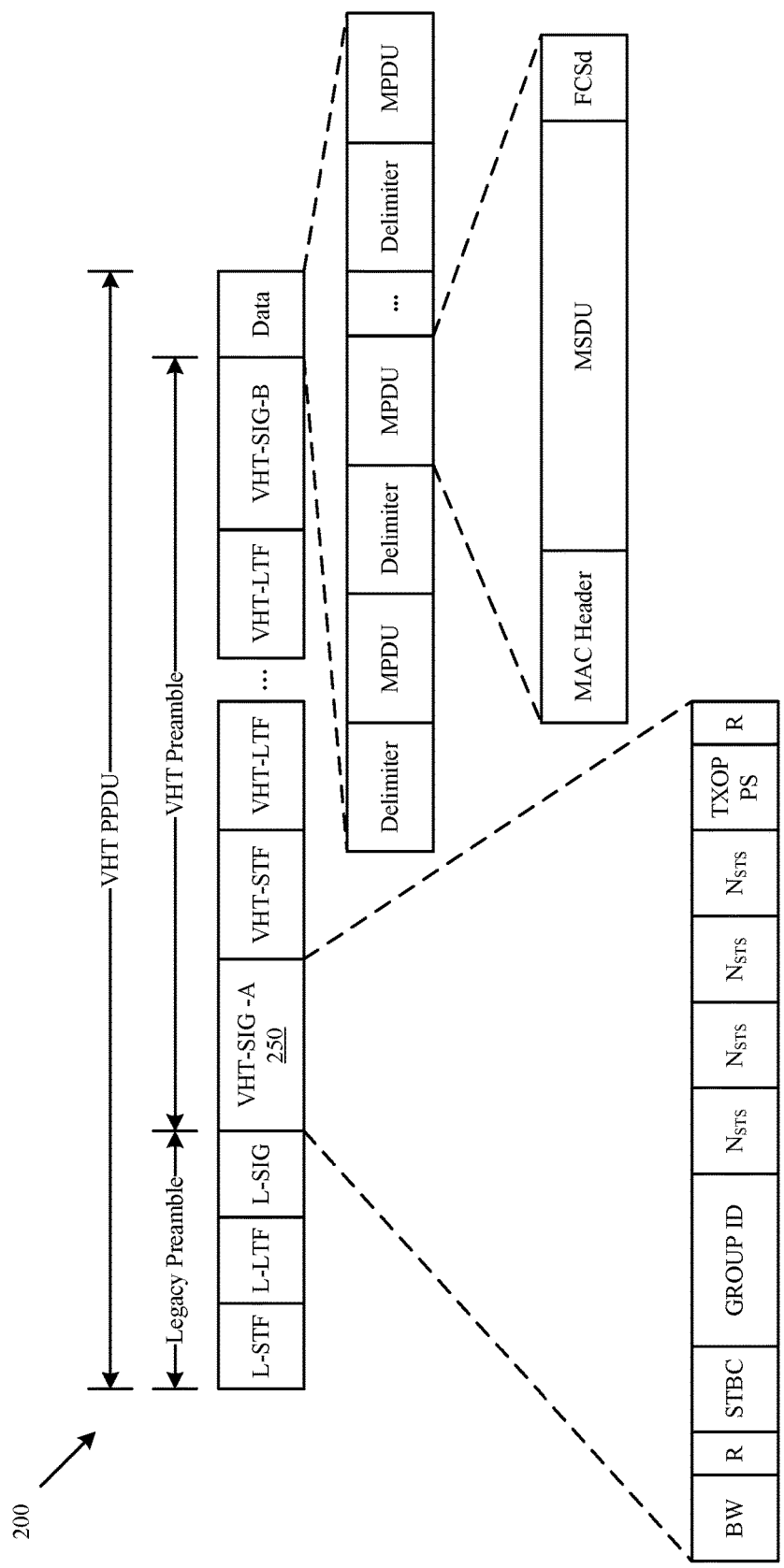
FIG. 2 illustrates an exemplary packet format for a very high transmission (VHT) packet for a WLAN protocol.

FIG. 2 illustrates a diagram 200 of an exemplary packet format for a very high transmission (VHT) physical layer convergence protocol (PLCP) protocol data unit (PDU), referred to as a VHT PPDU or as a VHT PHY layer frame herein, for a WLAN communication protocol. The IEEE 802.11ac VHT physical (PHY) layer communication protocol improved upon the 802.11n high transmission (HT) PHY layer by increasing available maximum bandwidths from 40 MHz to 160 MHz and increasing the maximum number of possible parallel spatial streams from 4 to 8. In addition, MIMO transmission capabilities were expanded from only single user MIMO (SU-MIMO) to include multi-user MIMO (MU-MIMO), where individual frames can be sent to multiple recipients simultaneously in the same frequency band. As described further herein, the format for a VHT PHY layer frame can be re-used for multicast transmission by an AP 106 to send a single copy of data to multiple recipients at the lower layers, e.g., the MAC/PHY layers, rather than requiring the use of higher layers, e.g. the IP transport layers to accomplish this function. The AP 106 can conserve the bandwidth for greater efficiency by avoiding duplicate transmission of common data to multiple recipients by reusing and/or modifying the frame format provided for MU-MIMO to provide multicast transmission.

The VHT PPDU includes a legacy preamble for compatibility with stations and access points that use a non-HT, e.g., 802.11a/g, WLAN communication protocol. The legacy preamble includes a legacy short training field (L-STF), a legacy long training field (L-LTF), and a legacy signal field (L-SIG). The legacy preamble is followed by a VHT preamble, which includes a number of individual fields for training and signaling, followed by a set of VHT short and long training fields and a second signaling field. The first field of the VHT preamble, labeled as the VHT-SIG-A field 250 is used to indicate frame attributes, including parameters that specify properties of data that follows. The VHT-SIG-A field 250 includes a channel bandwidth (BW), a reserved (R) bit, a space-time block coding (STBC) bit, a Group ID, which indicates the frame is for a single user or for multiple users of a group identified by the Group ID value, and a series of fields that indicate the number of parallel state-time streams ($N_{STS}$) for each user, a transmit power save option (TXOP PS) indicator bit, and another reserved (R) bit. Each user examines values in the $N_{STS}$ field at the position corresponding to the user within the group as indicated in a management action frame to learn the number of parallel streams for that user. The order of users within a group also determines the order for streams of data provided in the data field. For example, considering the four different $N_{STS}$ fields shown in FIG. 2 as four different user positions, the first $N_{STS}$ field contains a value for the number of streams that would correspond to the first user (which corresponds to a particular STA 102 of a group). Streams of data are ordered in the field accordingly. For MU-MIMO each data stream is intended for a different user, so individual streams are not shared, but as discussed further herein, instead the parallel data streams can instead correspond to different channels or media streams that can be read by more than one STA 102 of a group rather than by only one STA 102 of a group. Certain values for the Group ID field are reserved for single user frames in either the uplink direction (STA 102 to AP 106) or in the downlink direction (AP 106 to STA 102), while the remaining values for the Group ID field are used to specify a particular group of users, which have been assigned to a group using a management action frame, the format of which is described further herein. A multi-user frame can communicate different MAC layer PDUs (MPDUs) to different users, where each user of the multi-user frame belongs to a particular group that is specified by the Group ID field value. The data portion of the VHT PPDU includes multiple MPDUs, each MPDU including a MAC header a MAC layer service data unit (SDU), labeled as an MSDU, and a frame check sequence (FCS) for the data, labeled as an FCSd field. A delimiter field separates each MPDU. As the data portion of the VHT PPDU includes data for multiple users, the data field is necessarily an aggregated MPDU (A-MPDU). As described further herein, the use of the Group ID field can be modified to allow for sending the same data (rather than different data) to a group of stations (client devices). Thus, a unicast MU-MIMO frame format can be reused, by an AP 106, as a multicast format to send parallel data to multiple STAs 102.

Figure 3:
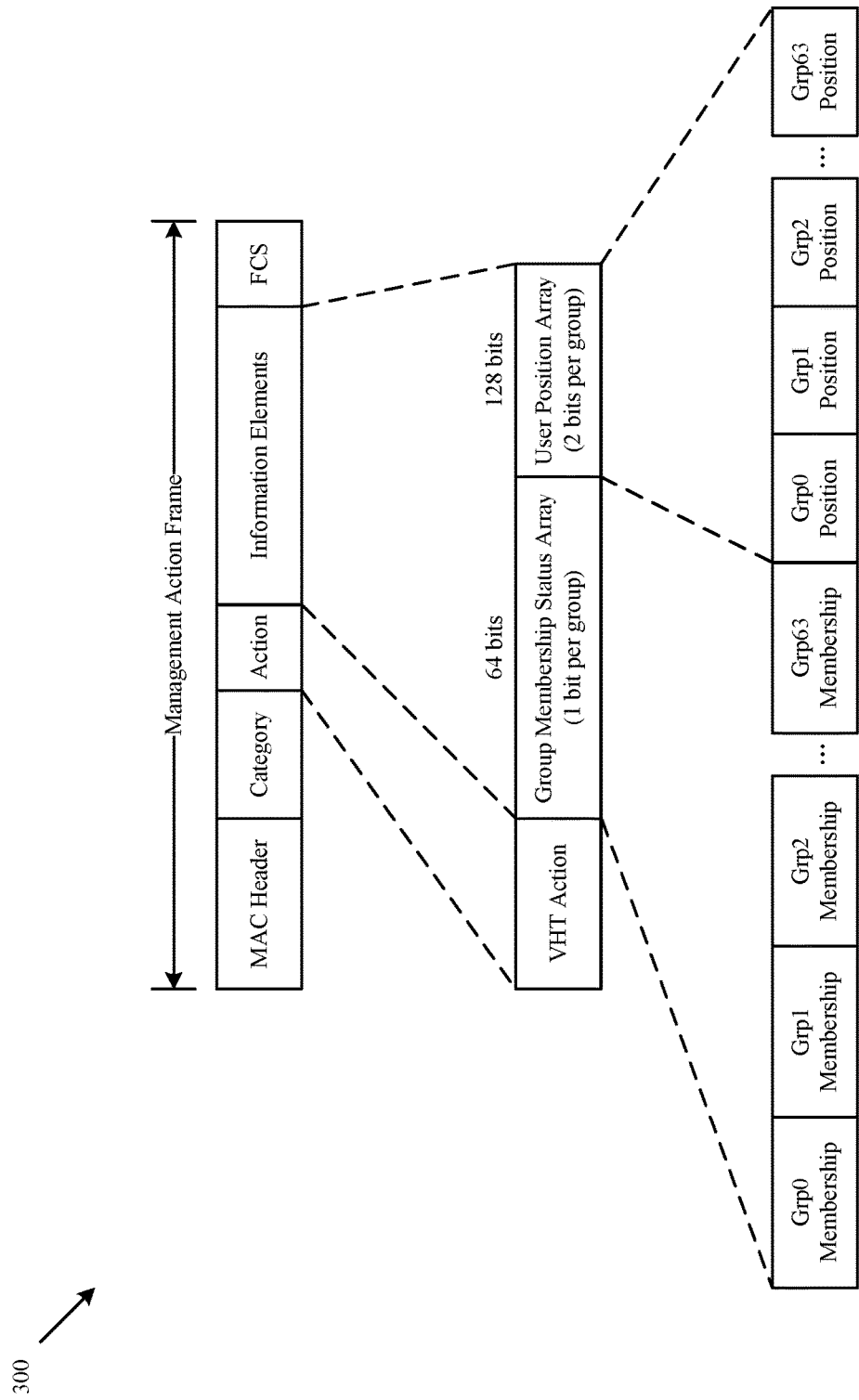
FIG. 3 illustrates an exemplary management action frame format for multiuser communication for a WLAN protocol.

FIG. 3 illustrates a diagram 300 of an exemplary packet format for a management action frame that includes a value in the action field for a VHT type of action and information elements that describe group membership for a particular STA 102. A group membership status array field includes a one bit indicator for each group to indicate whether the STA belongs to a corresponding group. Each STA 102 can belong to no groups, one group, or multiple groups. As each group of STAs 102 (also indicated as users for a group) can include up to four different STAs 102, each STA 102 in the group is assigned a position in the group according to two bits for each group, where the two bits can indicate the order for reading data in a data portion of a data frame. In some embodiments, the number of bits per group in the user position array can be changed, e.g., to include three bits per group to indicate positions for a larger group of up to eight individual STAs 102. A management action frame that includes an indication of group membership can be sent to each STA 102 in a group before sending a multi-user data frame. The access point forms groups and establishes unique positions for each STA 102 within a group. The Group ID management frame can be sent as a unicast message to each STA 102.

As described further herein, the Group ID field can be reused to provide multicast frames of data to a set of STAs 102, where each STA 102 receives the same data rather than different data as would occur with a multiuser data frame. In some embodiments, each Group ID field value can be assigned to a different stream of data, e.g., a stream of audio, video, multimedia, messaging, or other type of media stream that can be sent to multiple STAs 102 simultaneously. In some embodiments, the different streams correspond to different channels of a broadcast or multicast service, such as provided for viewing live events or interactive sessions. In some embodiments, the different channels correspond to different stored (perhaps previously broadcast and archived) media streams. In some embodiments, each STA 102 of a group can receive the same simultaneous (or near simultaneous) stream of media for playback or for an interactive session. In some embodiments, at the request of a STA 102, the AP 106 can assign the STA 102 to a group and to subsequently receive data for a group to which that STA 102 requests to be added, where the group can correspond to a particular channel or media stream. In some embodiments, each group assigned a Group ID value can correspond to a particular frequency channel spanning a range of frequencies of a frequency band. In some embodiments, a frequency band is divided into a set of frequency channels, with each frequency channel assigned a unique Group ID value. In some embodiments, a STA 102 can access media content for a particular frequency channel by requesting to be assigned to belong to a particular group (or a set of particular groups) by sending a request to an AP 106, which can respond with a management action frame that assigns the STA 102 to one or more groups of the set of requested groups. The STA 102 can subsequently receive content using packet frames as formatted in FIG. 2, where the data field includes data for a frequency channel that can be received by multiple STAs 102. In some embodiments, the number of bits used for the user position array field can indicate the number of parallel frequency channels available, e.g., where three bits per group can indicate eight different frequency channels (or equivalently eight groups). The group position information can be used to indicate the order of portions of data, e.g., different MPDUs of an A-MPDU, that correspond to different channels. A user can subscribe to a group and can receive data for that group by reading the corresponding MPDU from the data field, where each MPDU includes data for a group, and data for different groups can be sent at the same time to multiple STAs 102.

Figure 4:
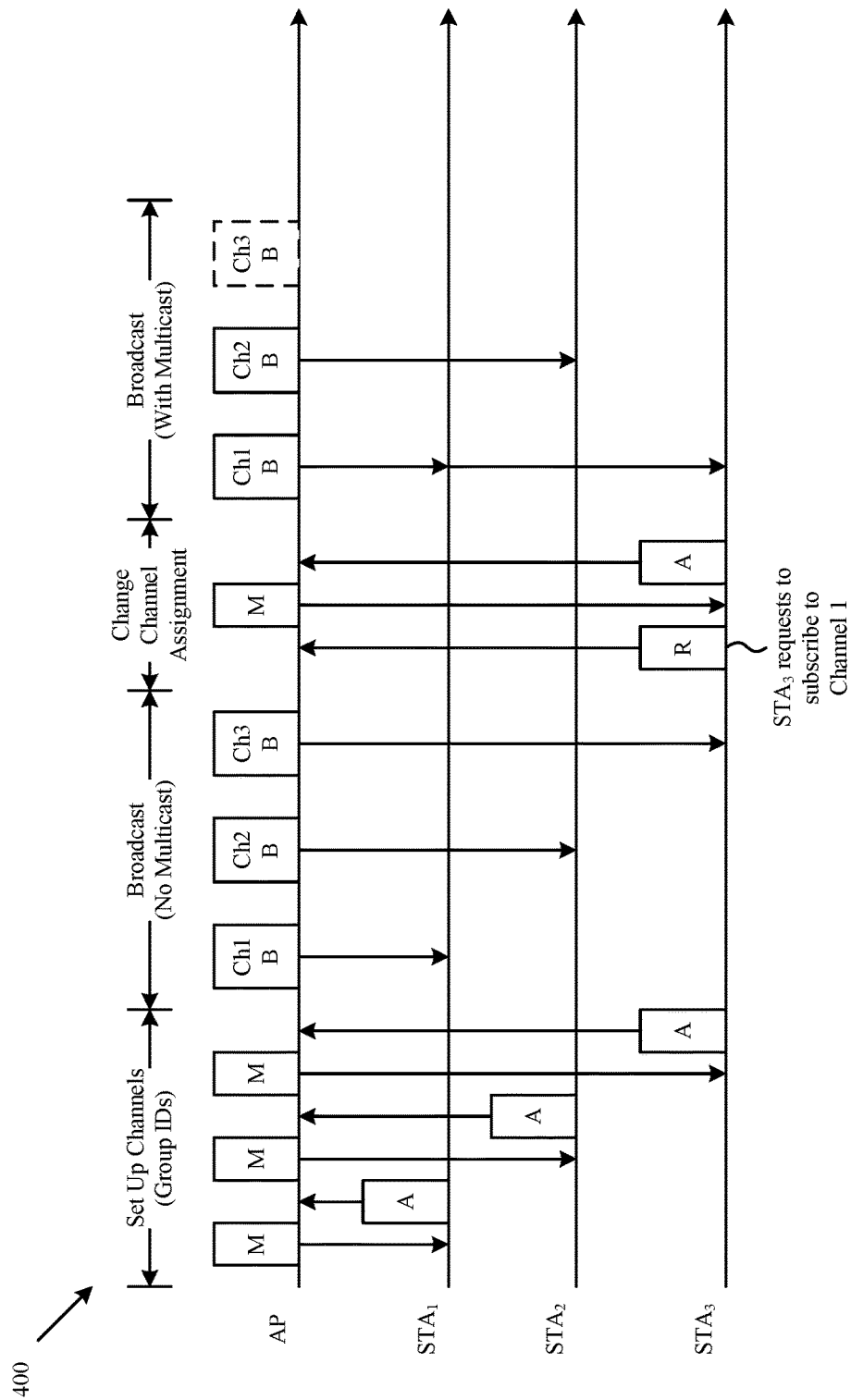
FIG. 4 illustrates an exemplary communication exchange using group identifiers to provide multicast packets between a WLAN access point and multiple LAN stations.

FIG. 4 illustrates an exemplary message exchange 400 between an AP 106 and multiple STAs 102, to establish membership in groups and to request assignment to a group. Initially, the AP 106 sends individual management action frames (labeled as M) to each of the different STAs 102, labeled as STA$_1$, STA$_2$, and STA$_3$. Each STA 102 responds to the received management action frame with an ACK (labeled as A). In some embodiments, the management action frames provided to the STAs 102 indicate their initial assignment to a group. In some embodiments, each group is associated with a unique group ID. In some embodiments, each group corresponds to a unique channel of data, e.g., streaming media or equivalent. In some embodiments, each STA 102 is assigned to a different group or channel. As shown in FIG. 4, parallel channels of data, each channel corresponding to a group, can be sent to each of the different STAs 102 individually, which can correspond to a broadcast without multicast scenario. A STA 102 can request to join a group, or equivalently to subscribe to a channel, by sending a request message (labeled as R) to the AP 106. The AP 106 can respond to the request form the STA 102 by sending another management action frame (labeled as M) to the STA 102 to assign the STA 102 that requested to join a particular group/channel, where the management action frame includes the assignment of the STA 102 to the particular requested group/channel. In some embodiments, the STA 102 requests to join multiple groups, using either a single request to join a set of groups, or using multiple individual requests, each request for a particular group. As further indicated in FIG. 4, after reassignment by the management action frame sent by the AP 106 to the STA 102 in response to the request, the STA 102 can receive data for a particular group/channel as requested. In some embodiments, the STA 102 receives data for only one group/channel at a time, and a request to join a group also constitutes a request to exit (unsubscribe) from a currently joined group/channel. As shown, the broadcast data can be received as multicast data for more than one STA 102, which results in more efficient use of bandwidth for communication, as the additional channel need not be broadcast if no members of the group are subscribed, and moreover, need not be repeated as would occur with a multiuser data frame that duplicates data for different users of a group. Instead different positions can correspond to different parallel sets of data that can be received as channels for each STA 102 that belongs to the corresponding group.

In some embodiments, the AP 106 assigns one or more Group IDs for multicast communication. In some embodiments, the AP 106 assigns different channels of data streams to different parallel space-time streams. In some embodiments, the AP 106 assigns different channels of data streams to different positions within a group for a Group ID assigned for multicast communication. In some embodiments, a STA 102 is informed of a multicast Group ID, or a set of multicast Group IDs, that can be used for multicast communication. In some embodiments, a STA 102 requests to the AP 106 to receive a particular stream of data by one or more of: (i) joining a group associated with a particular Group ID used for multicast communication, (ii) requesting to receive a stream associated with a particular Group ID, or (iii) requesting to receive a particular space-time stream of a particular Group ID. In some embodiments, multiple Group IDs are used in parallel, with each Group ID corresponding to a particular multicast data stream. In some embodiments, multiple parallel space-time streams of a Group ID are used in parallel, each space-time stream corresponding to a particular multicast data stream.

Figure 5:
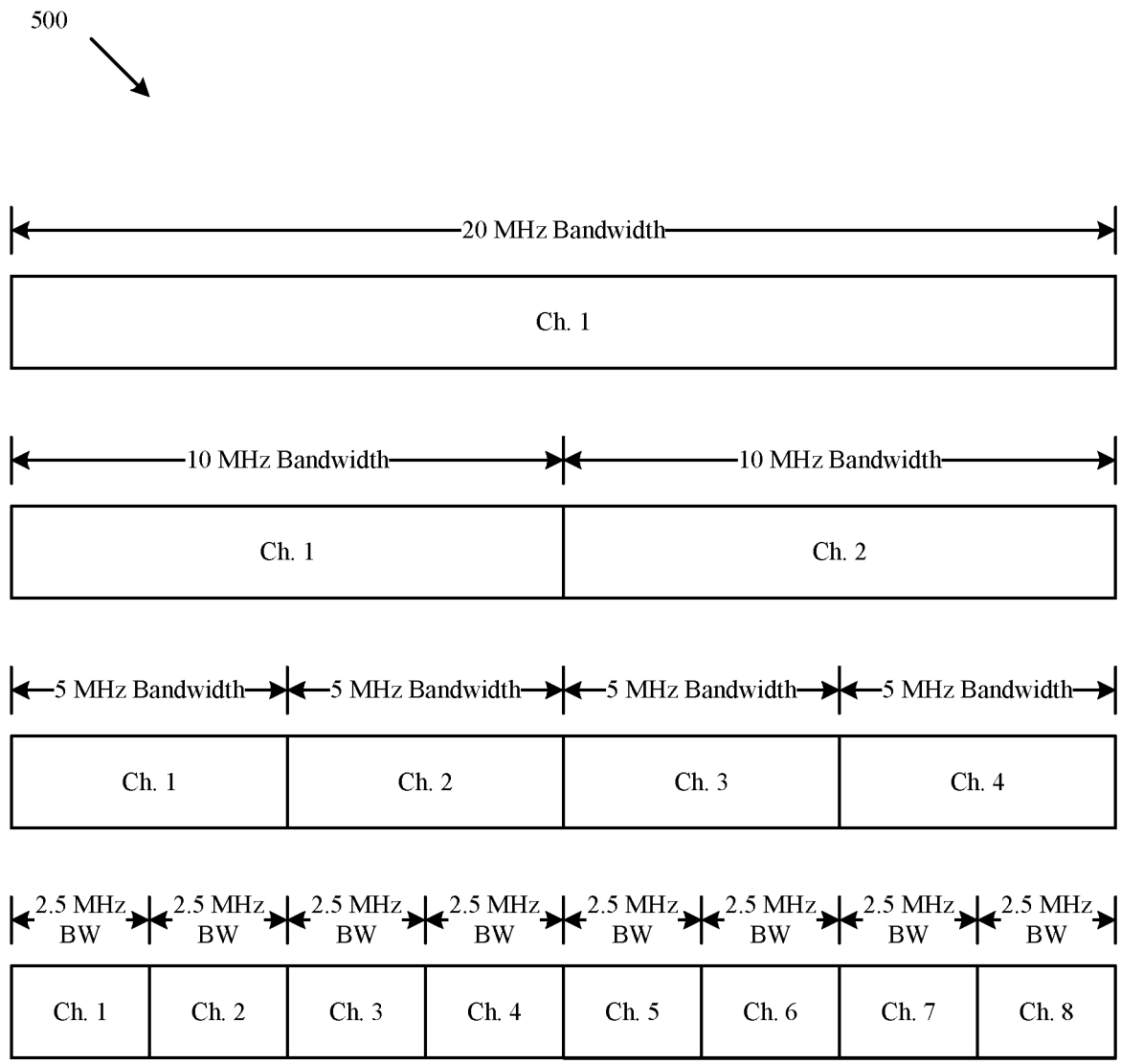
FIG. 5 illustrates an exemplary division of bandwidth to provide parallel channels for multicast transmission.

FIG. 5 illustrates a diagram 500 of an exemplary radio frequency (RF) bandwidth partitioned into multiple parallel RF channels. The RF bandwidth can be divided into multiple parallel frequency channels, each frequency channel corresponding to an individual data stream. In some embodiments, each frequency channel can be associated with a particular Group ID by an AP 106 and, a STA 102 can request to receive the data stream for the frequency channel by joining the particular Group ID. In some embodiments, each user position (as defined for a multiuser communication) of a Group ID corresponds instead to a distinct data stream. In some embodiments, each frequency channel corresponds to one of: (i) a particular group defined by a group ID, (ii) a user position within a group defined by a group ID and a position number, or (iii) a space-time stream for a particular user position within a group defined by a group ID. In some embodiments, the number of bits used to define the number of possible user positions and/or space-time streams can be used to define the number of parallel frequency channels available for STAs 102 of an AP 106 to receive using multicast communication as described herein. Multiple STAs 102 can receive the same data stream by belonging to the same group associated with a Group ID that is used for multicast communication.

Figure 6:
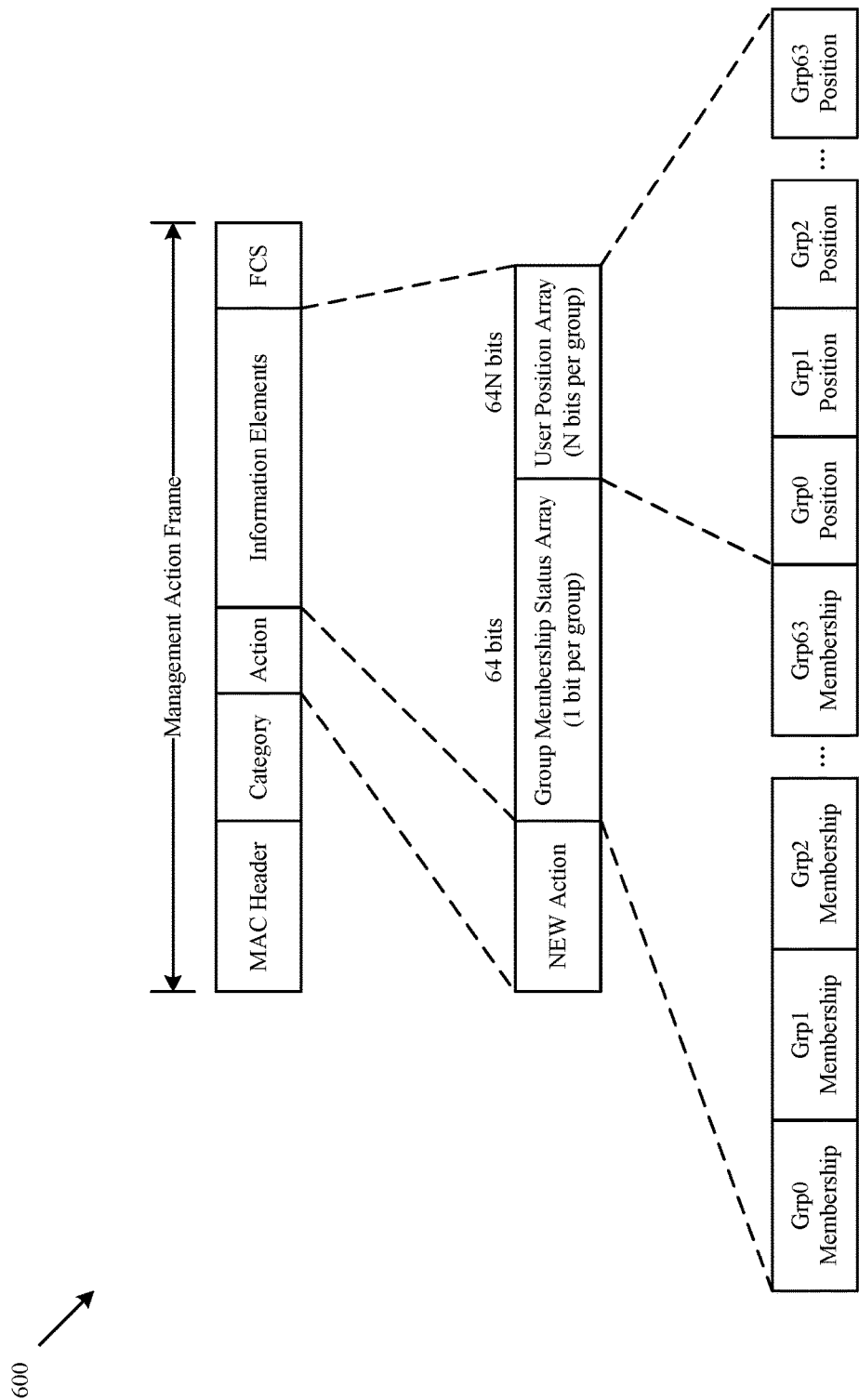
FIG. 6 illustrates an exemplary management action frame format for multicast transmission.

FIG. 6 illustrates a diagram 600 of an exemplary packet format for a management action frame that can be used by an AP 106 to communicate to one or more STAs 102 an indication of group membership and position with the group for the STAs 102. In some embodiments, the management action frame follows a format as used for 802.11 wireless communication protocols with a newly defined action type (labeled as "NEW Action" in FIG. 6, but any value can be assigned for this purpose) that indicates the use of Group IDs and user positions within a group to allow for parallel multicast reception of data streams. The management action frame can be unicast to a STA 102 and can indicate membership for the STA 102 within one or more groups, where one bit per group is provided to indicate membership within that group or lack thereof, and a user position array of bits that includes N bits per group to indicate one of $2^N$ positions for the user within the group. In some embodiments, one or more Group IDs are reserved for multicast communication, and different user positions within a group that uses one of the multicast Group IDs provide different multicast data streams to which a STA 102 can subscribe. In some embodiments, the combination of membership in a group, according to a Group Membership Status Array and a particular position within the group, according to a User Position Array, can indicate one or more multicast data streams to which a STA 102 is assigned for reception (possibly in parallel with other STAs 102 associated with the same AP 106). Thus, in some embodiments, multiple STAs 102 can be assigned to the same user position with a group for a Group ID used for multicast communication. In some embodiments, each Group ID, of a set of Group IDs, can be associated with a radio frequency band that is divided into a number of parallel radio frequency channels and each position with the group (radio frequency band) corresponds to a particular radio frequency channel within the radio frequency band. For example, with three bits used for values in the User Position Array for a particular group, an associated radio frequency band can be divided into eight ($2^3$) parallel radio frequency channels.

In some embodiments, a multicast data frame, formatted as shown in FIG. 2 and communicated by an AP 106 to one or more STAs 102, can include $N_{STS}$ fields that indicate a number of spatial streams for a particular position within a group, where the position can correspond to a data stream that a STA 102 can receive. In some embodiments, values in the $N_{STS}$ fields indicate a number of parallel radio frequency channels that are aggregated together, e.g., using carrier aggregation to form a combined data stream using an aggregated frequency channel. In some embodiments, the set of $N_{STS}$ fields together indicate how a frequency band is divided into sets of parallel frequency channels, which can be grouped together to form aggregated frequency channels. For example, an ordered set of four $N_{STS}$ field values can indicate how four parallel data streams are sent over a frequency band using different numbers of parallel radio frequency channels. A first $N_{STS}$ value (of the four $N_{STS}$ field values) indicates how many adjacent frequency channels are assigned to a first data stream (e.g., starting from a lowest frequency channel), a second $N_{STS}$ value indicates how many next adjacent frequency channels are assigned to the next data stream, and similarly continuing for the third and fourth $N_{STS}$ values. In some embodiments, the total of the set of $N_{STS}$ field values summed together equals the total number of available parallel frequency channels that are formed by dividing up a radio frequency band for multicast communication.

Figure 7:
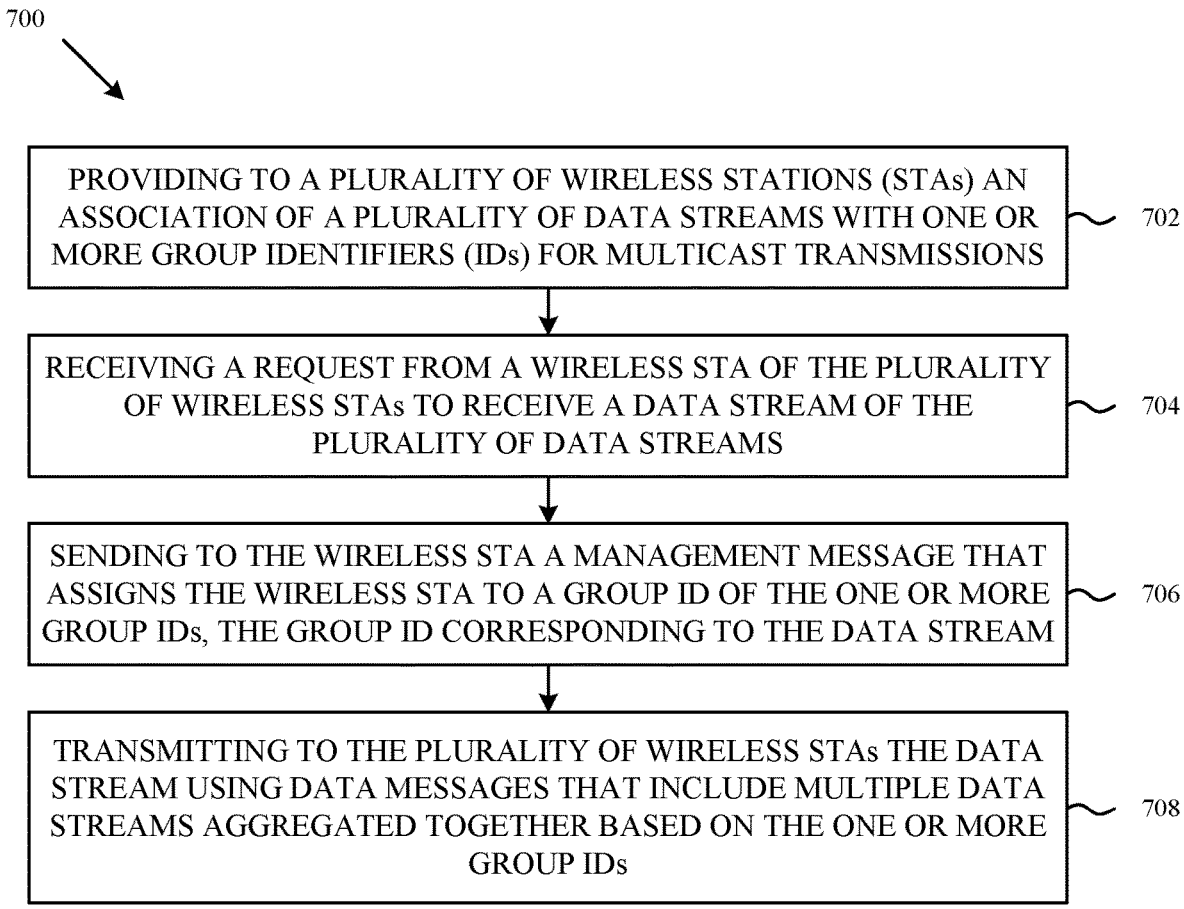
FIG. 7 illustrates an exemplary method for multicast transmission by a WLAN access point.

FIG. 7 illustrates a flow chart 700 of an exemplary process for transmission of multicast packet communication by an AP 106. At 702, the AP 106 provides an association of multiple data streams with one or more group identifiers (Group IDs) of groups used for multicast transmissions to multiple wireless STAs 102. In some embodiments, the association of Group IDs to data streams is sent using a broadcast message. In some embodiments, the association of Group IDs to data streams is sent using a unicast management action frame. In some embodiments, the AP 106 assigns each STA 102 of the multiple wireless STAs 102 to one or more of the data streams using a Group ID assignment before receiving a request from the STA 102, e.g., by providing a default data stream. At 704, the AP 106 receives a request from a wireless STA 102, which is one of the multiple wireless STAs 102, the request indicating the wireless STA 102 seeks to receive a data stream (or a set of data streams) of the multiple data streams. At 706, the AP 106 responds to the request from the wireless STA 102 by sending a management message to the wireless STA 102, where the management message assigns the STA 102 to a Group ID of the one or more Group IDs for groups used for multicast transmissions in order to indicate acceptance to receive the data stream requested by the STA 102. In some embodiments, the wireless STA 102 requests to receive multiple data streams. In some embodiments, the AP 106 assigns the STA 102 to one or more Group IDs that correspond to the multiple requested data streams. In some embodiments, the AP 106 assigns the STA 102 to a user position of a Group ID, where the Group ID is used for multicast transmissions and the user position corresponds to the requested data stream. In some embodiments, the STA 102 requests to receive multiple data streams, and the AP 106 assigns the STA 102 to one or more Group IDs that correspond to the multiple data streams, where each data stream is associated with a particular Group ID, and in some embodiments, each data stream is also associated with a particular user position of a corresponding particular Group ID. At 708, the AP 106 transmits to the multiple STAs 102 the data stream, including to the STA 102 that requested to receive the data stream, using data messages that include multiple data streams aggregated together based on the one or more Group IDs. In some embodiments, the AP 106 receives a second request from a second wireless STA 102 to receive the data stream requested by the (first) wireless STA 102. The AP 106, sends to the second wireless STA 102 a second management message that assigns the second wireless STA 102 to the Group ID associated with the data stream. The (first) wireless STA 102 and the second wireless STA 102 both receive the data stream by receiving the subsequent same data messages that include the data stream for the associated Group ID. In some embodiments, both (first and second) wireless STAs 102 are assigned to the same Group ID and/or to the same user position of the Group ID to receive the data stream in parallel using the same messages. In some embodiments, the management message is a management action frame formatted in accordance with an 802.11 wireless communication protocol. In some embodiments, the data messages include VHT PPDUs that include multiple MAC layer PDUs aggregated together. In some embodiments, the Group IDs used for multicast transmissions are dedicated for multicast transmission use by the AP 106. In some embodiments, the user position of a Group ID is used to indicate a group position for a STA 102 to receive a requested data stream. In some embodiments, each data stream of a set of multiple data streams is associated with a different radio frequency channel (or set of radio frequency channels) of a radio frequency band, where the radio frequency band is associated with a particular Group ID. In some embodiments, each radio frequency channel (or set of radio frequency channels) is associated with a distinct group (user) position for a Group ID. In some embodiments, at least one data stream of a set of multiple data streams is associated with multiple radio frequency channels of a radio frequency band, where the radio frequency band is associated with a Group ID, and multiple radio frequency channels are communicated in parallel using carrier aggregation.

Figure 8:
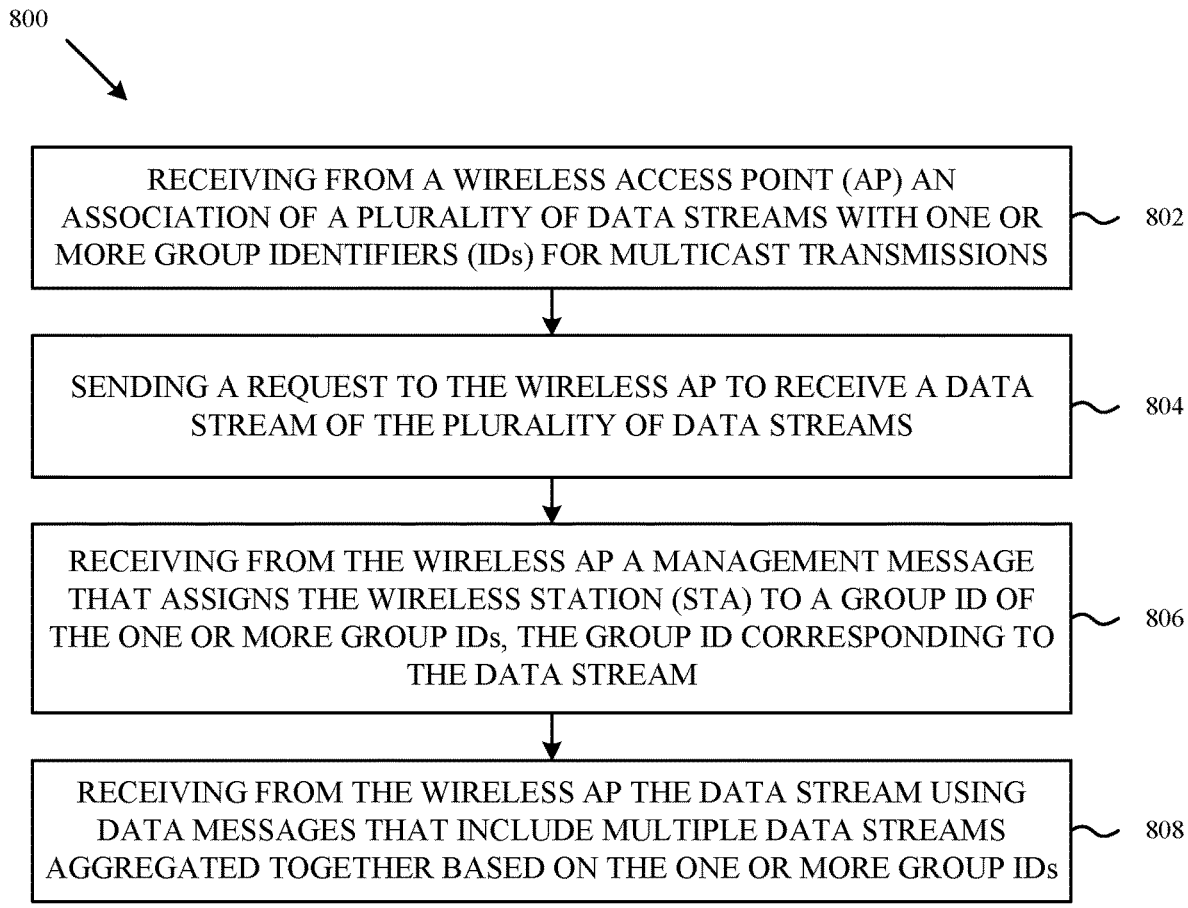
FIG. 8 illustrates an exemplary method for multicast reception by a WLAN station.

FIG. 8 illustrates a flow chart 800 of an exemplary process for reception of multicast packet communication by a wireless STA 102. At 802, the wireless STA 102 receives from a wireless AP 106 an association of multiple data streams with one or more group identifiers (Group IDs), where the Group IDs are used for multicast transmissions. At 804, the wireless STA 102 sends a request to the wireless AP 106 to receive one or more of the data streams of the multiple data streams. At 806, the wireless STA 102 receives from the wireless AP 106 a management message that assigns the wireless STA 102 to a Group ID of the one or more Group IDs, where the Group ID corresponds to the requested data stream. In some embodiments, the wireless STA 102 is assigned to a particular group (user) position for the Group ID in order to receive the requested data stream. At 808, the wireless STA 102 receives from the wireless AP 106 one or more data messages that include multiple data streams aggregated together based on the one or more Group IDs, where the requested data stream is one of the multiple data streams. In some embodiments, each of the multiple data streams is associated with a particular group (user) position within the Group ID. In some embodiments, one or more of the data streams are communicated in parallel to multiple wireless STAs 102 using the same data messages, where multiple wireless STAs 102 receive the same data stream.

Figure 9:
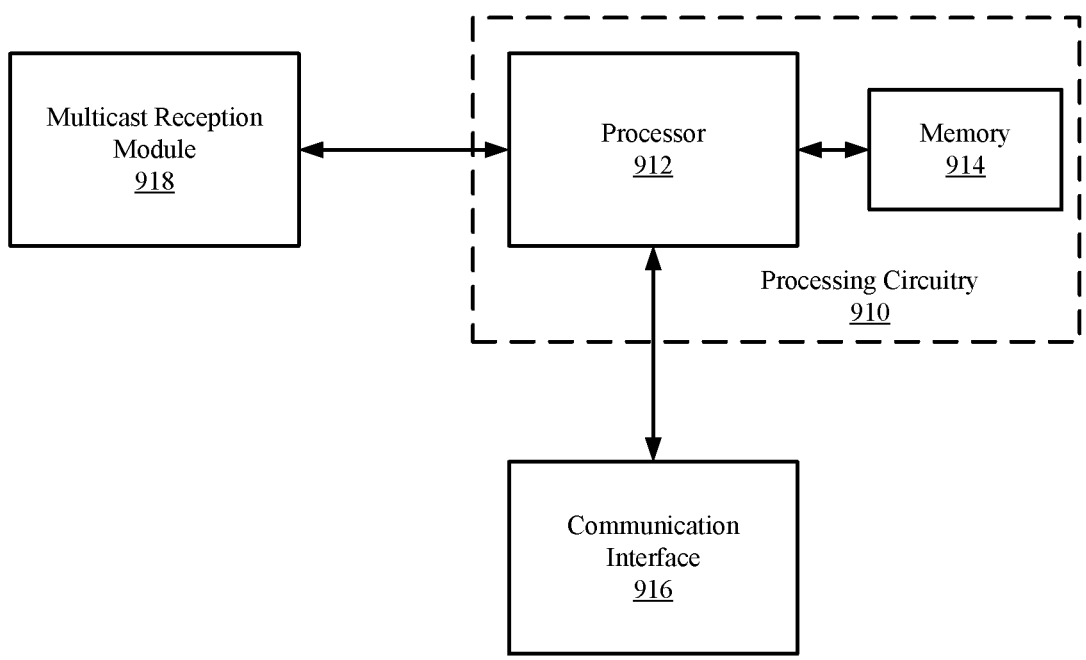
FIG. 9 illustrates a block diagram of an exemplary apparatus that can be implemented on a WLAN station.

FIG. 9 illustrates a block diagram 900 of an exemplary apparatus that can be implemented on a STA 102, in accordance with some embodiments. In this regard, when implemented on a computing device, such as the STA 102, the exemplary apparatus can enable the computing device to operate within a WLAN, such as the WLAN 104, and to receive multicast transmission in accordance with some embodiments. It will be appreciated that the components, devices or elements illustrated in and described with respect to FIG. 9 may not be mandatory and thus some may be substituted for or omitted in certain embodiments. Additionally, some embodiments can include further or different components, devices or elements beyond those illustrated in and described with respect to FIG. 9.

In some embodiments, the exemplary apparatus illustrated by the block diagram 900 of FIG. 9 can include processing circuitry 910 that is configurable to perform actions in accordance with one or more embodiments disclosed herein. In this regard, the processing circuitry 910 can be configured to perform and/or control performance of one or more functionalities of the apparatus illustrated by the block diagram 900 in accordance with some embodiments, and thus can provide means for performing functionalities of the apparatus in accordance with various embodiments. In some embodiments, the processing circuitry 910 can be configured to perform data processing, application execution and/or other processing and management services.

In some embodiments, the apparatus illustrated by the block diagram 900 or a portion(s) or component(s) thereof, such as the processing circuitry 910, can include one or more chipsets, which can each include one or more chips. The processing circuitry 910 and/or one or more further components of the apparatus can therefore, in some instances, be configured to implement an embodiment on a chipset including one or more chips. In some embodiments in which one or more components of the apparatus of the block diagram 900 illustrated in FIG. 9 are embodied as a chipset, the chipset can be capable of enabling a computing device to operate in the example system 100 when implemented on or otherwise operably coupled to the computing device. Thus, for example, one or more components of the apparatus can provide a chipset configured to enable a computing device to operate on a WLAN, such as WLAN 104, in accordance with one or more example embodiments.

In some example embodiments, the processing circuitry 910 can include a processor 912 and, in some embodiments, such as that illustrated in FIG. 9, can further include memory 914. The processing circuitry 910 can be in communication with or otherwise control a communication interface 916, and/or a multicast reception module 918. The processor 912 can be embodied in a variety of forms. For example, the processor 912 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 912 can comprise a plurality of processors. The plurality of processors can be in operative communication with each other and can be collectively configured to perform one or more functionalities of the apparatus of the block diagram 900 as described herein. In some example embodiments, the processor 912 can be configured to execute instructions that can be stored in the memory 914 or that can be otherwise accessible to the processor 912. As such, whether configured by hardware or by a combination of hardware and software, the processor 912 can be capable of performing operations according to various embodiments while configured accordingly.

In some example embodiments, the memory 914 can include one or more memory devices. Memory 914 can include fixed and/or removable memory devices. In some embodiments, the memory 914 can provide a non-transitory computer-readable storage medium that can store computer program instructions that can be executed by the processor 912. In this regard, the memory 914 can be configured to store information, data, applications, instructions and/or the like for enabling the apparatus of the block diagram 900 to carry out various functions in accordance with one or more example embodiments. In some embodiments, the memory 914 can be in communication with one or more of the processor 912, communication interface 916, or multicast reception module 918 via a bus(es) for passing information among components of the apparatus.

The apparatus illustrated in block diagram 900 can further include the communication interface 916. The communication interface 916 can include wireless circuitry configurable to provide one or more interface mechanisms for enabling communication with other devices and/or networks. For example, the communication interface 916 can include a transceiver configured to enable the apparatus to send wireless signals to and receive signals via one or more antennas as part of communication within a WLAN, such as WLAN 104. The communication interface 916 can accordingly be configured in embodiments in which the apparatus is implemented on the STA 102 to enable the STA 102 to send signals to and receive signals from the AP 106. In various example embodiments, the communication interface 916 can additionally or alternatively include, for example, an antenna (or multiple antennas) and supporting hardware and/or software for enabling communications with one or more further wireless communication networks, such as a cellular network, and/or a communication modem or other hardware/software for supporting communication via cable, digital subscriber line (DSL), USB, FireWire, Ethernet or other wireline networking methods.

The apparatus of the block diagram 900 illustrated in FIG. 9 can further include the multicast reception module 918. The multicast reception module 918 can be embodied as various means, such as circuitry, hardware, a computer program product comprising a computer readable medium (for example, the memory 914) storing computer readable program instructions executable by a processing device (for example, the processor 912), or some combination thereof. In some embodiments, the processor 912 (or the processing circuitry 910) can include, or otherwise control the multicast reception module 918. In some embodiments, the multicast reception module 918 can request to receive a particular data stream (or a set of data streams) used for multicast transmission by an AP 106 and receive the data stream(s) from the AP 106 by extracting from data messages that include multiple parallel data streams aggregated together, where each data stream can be received by multiple wireless STAs 102.

Figure 10:
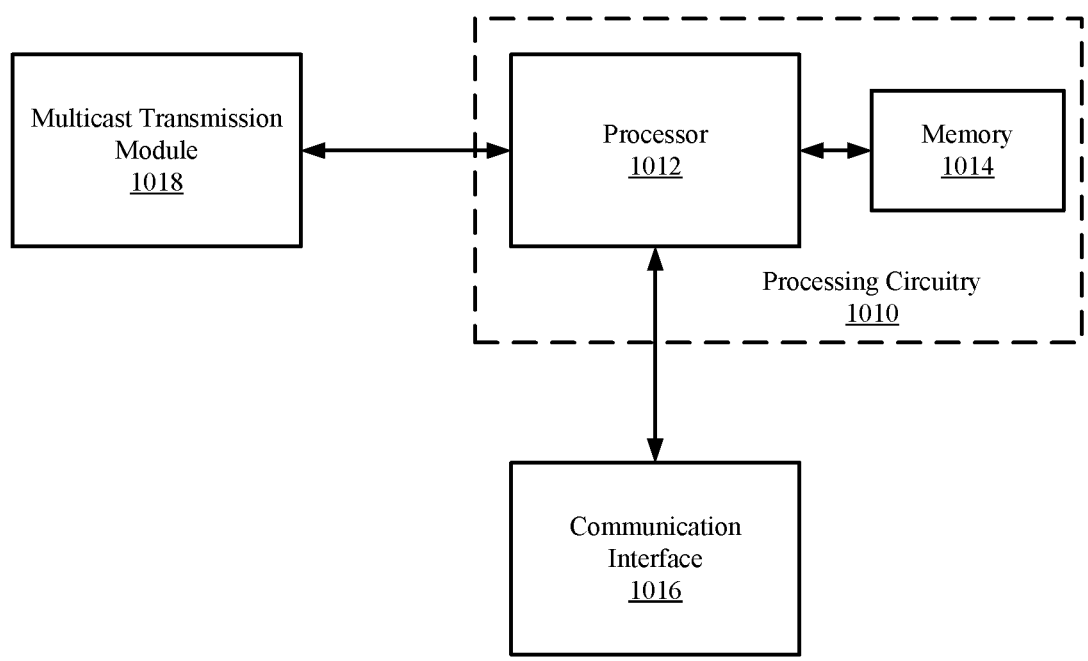
FIG. 10 illustrates a block diagram of an exemplary apparatus that can be implemented on a WLAN access point.

FIG. 10 illustrates a block diagram 1000 of an exemplary apparatus that can be implemented on a WLAN access point, such as AP 106, in accordance with some embodiments. In this regard, when implemented on a computing device, such as AP 106, the apparatus of block diagram 1000 can enable the computing device to function as an access point for a WLAN, such as WLAN 104, in accordance with some embodiments. It will be appreciated that the components, devices or elements illustrated in and described with respect to FIG. 10 may not be mandatory and thus some may be omitted in certain embodiments. Additionally, some embodiments can include further or different components, devices or elements beyond those illustrated in and described with respect to FIG. 10.

In some embodiments, the apparatus of block diagram 1000 can include processing circuitry 1010 that is configurable to perform actions in accordance with one or more example embodiments disclosed herein. In this regard, the processing circuitry 1010 can be configured to perform and/or control performance of one or more functionalities of the apparatus of block diagram 1000 in accordance with various embodiments, and thus can provide means for performing functionalities of the apparatus of block diagram 1000 in accordance with various example embodiments. The processing circuitry 1010 can be configured to perform data processing, application execution and/or other processing and management services according to one or more example embodiments.

In some embodiments, the apparatus illustrated by the block diagram 1000 or a portion(s) or component(s) thereof, such as the processing circuitry 1010, can include one or more chipsets, which can each include one or more chips. The processing circuitry 1010 and/or one or more further components of the apparatus illustrated by the block diagram 1000 can therefore, in some instances, be configured to implement an embodiment on a chipset including one or more chips. In some example embodiments in which one or more components of the apparatus of block diagram 1000 are embodied as a chipset, the chipset can be capable of enabling a computing device to function as a WLAN access point, such as the AP 106 in the example system 100.

In some embodiments, the processing circuitry 1010 can include a processor 1012 and, in some embodiments, such as that illustrated in FIG. 10, can further include memory 1014. The processing circuitry 1010 can be in communication with or otherwise control the communication interface 1016, and/or the multicast transmission module 1018. The processor 1012 can be embodied in a variety of forms. For example, the processor 1012 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 1012 can comprise a plurality of processors. The plurality of processors can be in operative communication with each other and can be collectively configured to perform one or more functionalities of the apparatus illustrated in the block diagram 1000 as described herein. In some embodiments, the processor 1012 can be configured to execute instructions that can be stored in the memory 1014 or that can be otherwise accessible to the processor 1012. As such, whether configured by hardware or by a combination of hardware and software, the processor 1012 can be capable of performing operations according to various embodiments while configured accordingly.

In some embodiments, the memory 1014 can include one or more memory devices. Memory 1014 can include fixed and/or removable memory devices. In some embodiments, the memory 1014 can provide a non-transitory computer-readable storage medium that can store computer program instructions that can be executed by the processor 1012. In this regard, the memory 1014 can be configured to store information, data, applications, instructions and/or the like for enabling the apparatus of block diagram 1000 to carry out various functions in accordance with one or more example embodiments. In some embodiments, the memory 1014 can be in communication with one or more of the processor 1012, communication interface 1016, or multicast transmission module 1018 via a bus(es) for passing information among components of the apparatus illustrated by the block diagram 1000 of FIG. 10.

The apparatus illustrated in the block diagram 1000 can further include a communication interface 1016. The communication interface 1016 can include one or more interface mechanisms for enabling communication with other devices and/or networks. For example, the communication interface 1016 can include a transceiver configured to enable the apparatus illustrated by the block diagram 1000 to send wireless signals to and receive signals from a WLAN, such as the WLAN 104. The communication interface 1016 can accordingly be configured in embodiments in which the apparatus is implemented on the AP 106 to enable the AP 106 to function as an access point for the WLAN 104 and to send signals to and receive signals from stations on the WLAN 104, such as to and from the STA 102. In various example embodiments, the communication interface 1016 can additionally or alternatively include, for example, an antenna (or multiple antennas) and supporting hardware and/or software for enabling communications with one or more further wireless communication networks and/or a communication modem or other hardware/software for supporting communication via cable, digital subscriber line (DSL), USB, FireWire, Ethernet or other wireline networking methods.

The apparatus illustrated in the block diagram 1000 can further include a multicast transmission module 1018. The multicast transmission module 1018 can be embodied as various means, such as circuitry, hardware, a computer program product comprising a computer readable medium (for example, the memory 1014) storing computer readable program instructions executable by a processing device (for example, the processor 1012), or some combination thereof. In some embodiments, the processor 1012 (or the processing circuitry 1010) can include, or otherwise control the multicast transmission module 1018.

The multicast transmission module 1018 can be configured in some embodiments to cause an access point, e.g., AP 106, to format messages, such as a WLAN packet, a management action frame, a multicast transmission message, a control message, or the like in accordance with packet structures illustrated herein. The multicast transmission module 1018 can be configured to cause the AP 106 to assign data streams to Group IDs and/or to group (user) positions within Group IDs, where the Group IDs are dedicated to multicast transmission use. The multicast transmission module 1018 can be configured to cause the AP 106 to provide assignments of Group IDs and/or group (user) positions within a set of one or more Group IDs to one or more STAs 102 of a WLAN 104. The multicast transmission module 1018 can be configured to receive requests from one or more STAs 102 of the WLAN 104 to receive one or more data streams, where each data stream is communicated to one or more STAs 102 using aggregated PPDUs. The multicast transmission module 1018 can be configured to assign a STA 102 (or multiple STAs 102) to receive multicast transmissions based on requests received form the STA(s) 102. The multicast transmission module 1018 can be configured to aggregate data streams into aggregated PPDU data messages using Group IDs allocated for multicast transmission and transmitting data messages to multiple STAs to receive the same data streams without duplicating each data stream for multiple STAs.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling wireless communication of an electronic device. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for multicast transmission from a wireless access point (AP) to a plurality of wireless stations (STAs) in a wireless local area network (WLAN), the method comprising:
by the wireless AP:
providing to the plurality of wireless STAs an association of a plurality of data streams with one or more groups having Group Identifiers (IDs) for multicast transmission and an association of at least one data stream with a position within one of the groups and its Group ID;
receiving a request from a wireless STA of the plurality of wireless STAs to receive a data stream of the plurality of data streams;
sending to the wireless STA a management message that:
assigns the wireless STA to the Group ID corresponding to the data stream, and
assigns the wireless STA to the position of the data stream within the group corresponding to the assigned Group ID; and transmitting to the plurality of wireless STAs the data stream using data messages that include multiple data streams aggregated together based on the Group IDs, wherein each wireless STA that is assigned the Group ID of the data stream and that requests receipt of the data stream uses the same data messages and at the position of the requested data stream to decode selected portions of the data messages and to receive the requested data stream.

2. The method of claim 1, further comprising:
by the wireless AP:
receiving a second request from a second wireless STA of the plurality of wireless STAs to receive the data stream; and
sending to the second wireless STA a second management message that assigns the second wireless STA to the Group ID,
wherein both the wireless STA and the second wireless STA use the same data messages at the position of the data stream within the group corresponding to the Group ID to decode and receive the data stream.

3. The method of claim 1, wherein the management message comprises a management action frame formatted in accordance with an 802.11 wireless communication protocol.

4. The method of claim 1, wherein the data messages comprise very high transmission (VHT) physical layer convergence protocol (PLCP) protocol data units (PDUs) that include multiple media access control (MAC) layer PDUs.

5. The method of claim 1, wherein the Group IDs for multicast transmission comprise a set of Group ID values assigned only for multicast transmission by the wireless AP.

6. The method of claim 1, wherein the management message that assigns the wireless STA to the Group ID further assigns the wireless STA to a group position within the Group ID, where the group position indicates data associated with the data stream requested by the wireless STA.

7. The method of claim 1, wherein each data stream of the plurality of data streams is associated with a different radio frequency channel of a radio frequency band, wherein the radio frequency band is associated with the Group ID.

8. The method of claim 7, wherein each radio frequency channel of the radio frequency band is associated with a distinct group position for the Group ID.

9. The method of claim 1, wherein at least one data stream of the plurality of data streams is associated with a plurality of radio frequency channels of a radio frequency band, wherein the radio frequency band is associated with the Group ID and the plurality of radio frequency channels are communicated in parallel using carrier aggregation.

10. A wireless access point (AP) configurable for multicast transmission to a plurality of wireless stations (STAs) in a wireless local area network (WLAN), the wireless AP comprising:
wireless circuitry communicatively coupled to a plurality of antennas;
one or more processors communicatively coupled to the wireless circuitry; and
a memory communicatively coupled to the one or more processors and storing instructions that, when executed by the one or more processors, cause the wireless AP to send multicast transmissions to a plurality of wireless stations (STAs) by at least:
providing to the plurality of wireless STAs an association of a plurality of data streams with one or more groups having Group Identifiers (IDs) for multicast transmission and an association of at least one data stream with a position within one of the groups and its Group ID
receiving a request from a wireless STA of the plurality of wireless STAs to receive A data stream of the plurality of data streams;
sending to the wireless STA a management message that:
assigns the wireless STA to the Group ID corresponding to the data stream, and
assigns the wireless STA to the position of the data stream within the group corresponding to the assigned Group ID; and
transmitting to the plurality of wireless STAs the data stream using data messages that include multiple data streams aggregated together based on the Group IDs, wherein each wireless STA that is assigned the Group ID of the data stream and that requests the data stream uses the same data messages and at the position of the requested data stream to decode selected portions of the data messages and to receive the requested data stream.

11. The wireless AP of claim 10, wherein execution of the instructions further causes the wireless AP to send multicast transmissions to a plurality of wireless stations (STAs) by at least:
receiving a second request from a second wireless STA of the plurality of wireless STAs to receive the data stream; and
sending to the second wireless STA a second management message that assigns the second wireless STA to the Group ID,
wherein both the wireless STA and the second wireless STA use the same data messages and the position of the data stream within the group corresponding to the Group ID to decode and receive the data stream.

12. The wireless AP of claim 10, wherein the management message comprises a management action frame formatted in accordance with an 802.11 wireless communication protocol.

13. The wireless AP of claim 10, wherein the data messages comprise very high transmission (VHT) physical layer convergence protocol (PLCP) protocol data units (PDUs) that include multiple media access control (MAC) layer PDUs.

14. The wireless AP of claim 10, wherein the Group IDs for multicast transmission comprise a set of Group ID values assigned only for multicast transmission use by the wireless AP.

15. The wireless AP of claim 10, wherein the management message that assigns the wireless STA to the Group ID further assigns the wireless STA to a group position within the Group ID, where the group position indicates data associated with the data stream requested by the wireless STA.

16. The wireless AP of claim 10, wherein each data stream of the plurality of data streams is associated with a different radio frequency channel of a radio frequency band, wherein the radio frequency band is associated with the Group ID.

17. The wireless AP of claim 16, wherein each radio frequency channel of the radio frequency band is associated with a distinct group position for the Group ID.

18. The wireless AP of claim 10, wherein at least one data stream of the plurality of data streams is associated with a plurality of radio frequency channels of a radio frequency band, wherein the radio frequency band is associated with the Group ID and the plurality of radio frequency channels are communicated in parallel using carrier aggregation.

19. A wireless station (STA) configurable for receiving multicast transmission from a wireless access point (AP) in a wireless local area network (WLAN), the wireless STA comprising:
wireless circuitry communicatively coupled to one or more antennas;
one or more processors communicatively coupled to the wireless circuitry; and
a memory communicatively coupled to the one or more processors and storing instructions that, when executed by the one or more processors, cause the wireless STA to receive multicast transmissions from the wireless AP by at least:
receiving from the wireless AP an association of a plurality of data streams with one or more groups having Group Identifiers (IDs) for multicast transmission and an association of at least one data stream with a position within one of the groups and its Group ID;
sending a request to the wireless AP to receive a data stream of the plurality of data streams;
receiving from the wireless AP a management message that:
assigns the wireless STA to the Group ID corresponding to the data stream, and
assigns the wireless STA to the position of the data stream within the group corresponding to the assigned Group ID; and
receiving from the wireless AP the data stream using data messages that include multiple data streams aggregated together based on the one or more Group IDs, wherein each wireless STA that is assigned the Group ID of the data stream and that requests the data stream uses the same data messages and at the position of the requested data stream to decode selected portions of the data messages and to receive the requested data stream.

20. The wireless STA of claim 19, wherein the management message that assigns the wireless STA to the Group ID further assigns the wireless STA to a group position within the Group ID, where the group position indicates data associated with the data stream requested by the wireless STA.

* * * * *

UNITED STATES PATENT AND TRADEMARK OFFICE
CERTIFICATE OF CORRECTION

PATENT NO. : 11,438,188 B2
APPLICATION NO. : 15/710708
DATED : September 6, 2022
INVENTOR(S) : Joonsuk Kim et al.

It is certified that error appears in the above-identified patent and that said Letters Patent is hereby corrected as shown below:

In the Claims

In Claim 1, at Column 17, Line 6: "data stream uses the same data messages and at the" should read -- data stream uses the same data messages and the --.

In Claim 2, at Column 17, Line 19: "STA use the same data messages at the position of the" should read -- STA use the same data messages and the position of the --.

In Claim 10, at Column 18, Line 5: "of wireless STAs to receive A data stream of the" should read -- of wireless STAs to receive a data stream of the --.

In Claim 10, at Column 18, Line 19: "data stream uses the same data messages and at the" should read -- data stream uses the same data messages and the --.

In Claim 19, at Column 20, Line 13: "data stream uses the same data messages and at the" should read -- data stream uses the same data messages and the --.

Signed and Sealed this
Nineteenth Day of September, 2023

Katherine Kelly Vidal
*Director of the United States Patent and Trademark Office*